United States Patent
Aschoff et al.

(10) Patent No.: US 11,704,956 B2
(45) Date of Patent: Jul. 18, 2023

(54) SYSTEM AND METHOD FOR TRACKING DOCUMENT SHREDDING AND VOTER BALLOTS

(71) Applicant: DataShield Corporation, Omaha, NE (US)

(72) Inventors: James Paul Aschoff, Alleman, IA (US); Brian Anthony Gubbels, Omaha, NE (US)

(73) Assignee: DataShield Corporation, Omaha, NE (US)

( * ) Notice: Subject to any disclaimer, the term of this patent is extended or adjusted under 35 U.S.C. 154(b) by 203 days.

(21) Appl. No.: 17/347,658

(22) Filed: Jun. 15, 2021

(65) Prior Publication Data

US 2021/0398379 A1  Dec. 23, 2021

Related U.S. Application Data

(60) Provisional application No. 63/139,053, filed on Jan. 19, 2021, provisional application No. 63/042,032, filed on Jun. 22, 2020.

(51) Int. Cl.
*G07C 13/02* (2006.01)
*B02C 18/00* (2006.01)
*B42D 25/29* (2014.01)
*B42D 25/305* (2014.01)

(52) U.S. Cl.
CPC .......... *G07C 13/02* (2013.01); *B02C 18/0007* (2013.01); *B42D 25/29* (2014.10); *B42D 25/305* (2014.10)

(58) Field of Classification Search
CPC .... G07C 13/02; B02C 18/0007; B42D 25/29; B42D 25/305
USPC .......................................................... 235/57
See application file for complete search history.

(56) References Cited

U.S. PATENT DOCUMENTS

| | | |
|---|---|---|
| 2002/0148889 A1 | 10/2002 | Vogel |
| 2008/0143096 A1 | 6/2008 | Haas et al. |
| 2010/0057617 A1 | 3/2010 | Jones et al. |
| 2012/0031961 A1 | 2/2012 | Kapsis |
| 2016/0300187 A1 | 10/2016 | Kashi et al. |

FOREIGN PATENT DOCUMENTS

JP  2019215653 A  * 12/2019

OTHER PUBLICATIONS

International Search Report and Written Opinion dated 9/16/23021 for PCT/US21/37749.

* cited by examiner

*Primary Examiner* — Thien M Le
*Assistant Examiner* — Tae W Kim
(74) *Attorney, Agent, or Firm* — Hovey Williams LLP

(57) ABSTRACT

A networked system of connected and trackable document deposit and destruction kiosks can be used to remotely dispose of and destroy confidential documents and monitors and records compliance with employer document destruction policies. A networked system of connected ballot deposit kiosks can be used to safely deposit, track, and verify the locations of completed ballots and to monitor and track the subsequent collection of the ballots by election officials or other authorized persons.

19 Claims, 10 Drawing Sheets

US 11,704,956 B2

SYSTEM AND METHOD FOR TRACKING DOCUMENT SHREDDING AND VOTER BALLOTS

RELATED APPLICATIONS

This patent application is a non-provisional patent application and claims priority benefit with regard to all common subject matter of U.S. Provisional Patent Application No. 63/042,032, Filed Jun. 22, 2020, and entitled "SYSTEM AND METHOD FOR TRACKING DOCUMENT SHREDDING" and U.S. Provisional Patent Application No. 63/139,053, Filed Jan. 19, 2021, and entitled "SYSTEM AND METHOD FOR TRACKING DOCUMENT SHREDDING AND VOTER BALLOTS", both of which are hereby incorporated by reference in their entireties into the present application.

BACKGROUND

Prior to Covid-19, remote employees, home based businesses and consumers lacked a secure, trackable, documented, and convenient method to dispose of confidential and private documents. The Covid-19 global pandemic significantly increased the number of work-from-home employees, and many companies plan to continue permitting, and sometimes even encouraging, such remote working arrangements in the future. Out-of-the-office employees are still required to abide by company-implemented document shredding policies, but they often lack convenient access to secure, compliant document shredding options. Furthermore, employers often lack a consistent verifiable program for remote employees and cannot verify remote employees are abiding by document shredding policies. These same problems also exist for home-based businesses and individuals who wish to destroy their own private and confidential documents.

Other documents, records, containers, packaging, products, expired pharmaceuticals and other items that have intrinsic or extrinsic value may also benefit from convenient, secure, contactless, item specific tracking and/or return processes. For example, ballots and other forms of election votes are increasingly being submitted by mail. This causes strain on postal systems and increases the risk of ballots not being delivered in time to be counted. Some people have also questioned the validity of mail-in ballots, which threatens the public's faith in the electoral process.

SUMMARY

The present invention solves the above-described problems and other related problems by providing a networked system of secure connected kiosks for depositing and tracking deposited documents for eventual destruction. The system can be used to remotely track the deposit and eventual destruction of financial statements, bank statements, tax documents, receipts, medical records, mail, confidential notes, schoolwork, office records and other paper products. The invention can also be used to track from deposit to disposal or delivery other individually identifiable non-paper items, such as electronic storage devices, disposable pharmaceutical, and other items that have intrinsic or extrinsic value at the item specific level. With regard to document disposal, the system also monitors and records compliance with employer document destruction policies and supplies individual users with online records of deposit and destruction of their confidential material.

Other embodiments of the invention solve the above-described ballot tracking problems and related problems by providing a networked system of connected ballot deposit kiosks that can be used to safely deposit, track, and verify the locations of completed ballots and to monitor and track the subsequent collection of the ballots by election officials or other authorized persons.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

Figure 2:
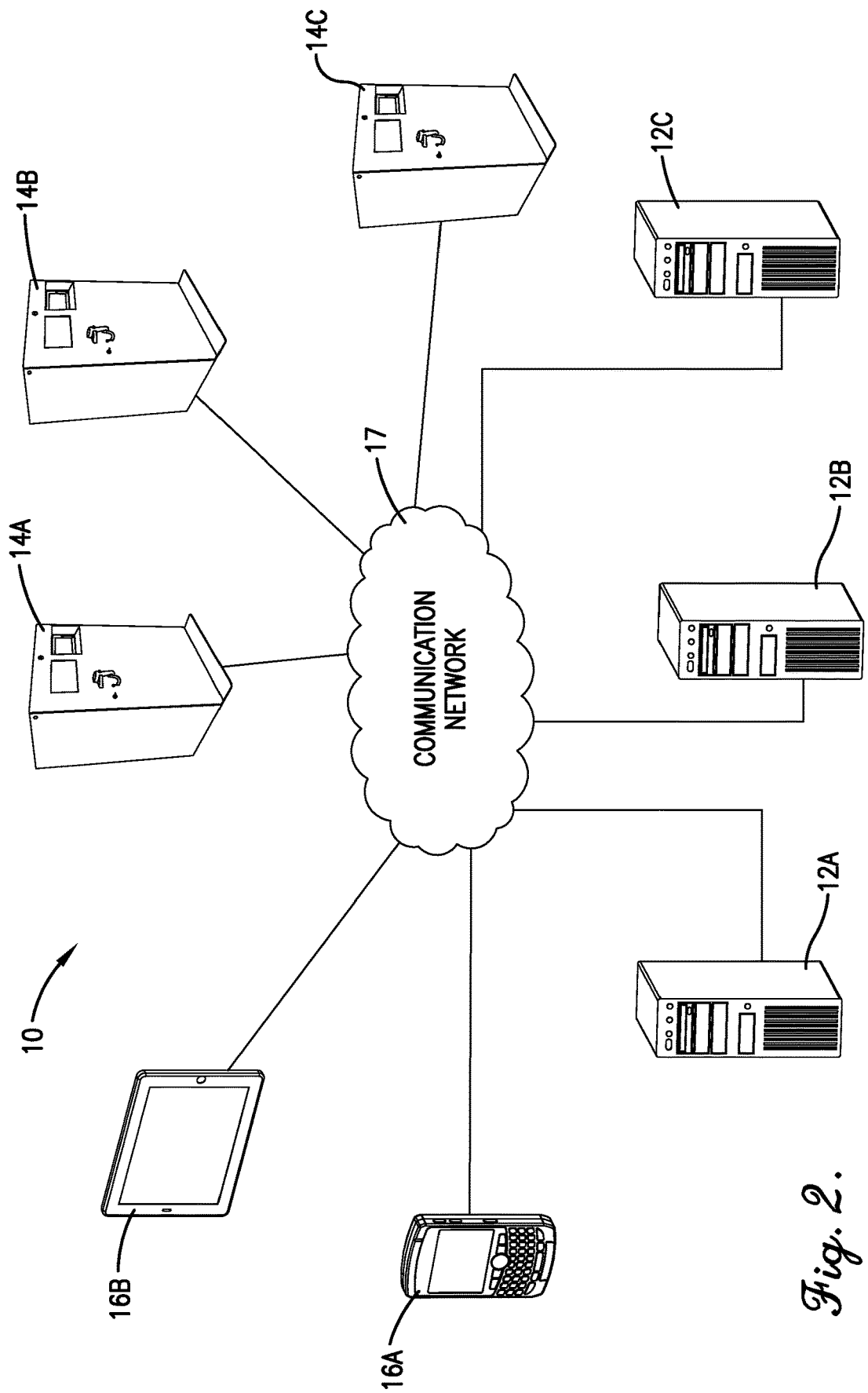
FIG. 2 is a schematic diagram of computing devices and kiosks that are part of a document destruction system in accordance with an embodiment of the invention.

Referring initially to FIG. 2, a system 10 for tracking document shredding in accordance with embodiments of the invention is illustrated. The system 10 broadly comprises a plurality of support computing devices 12A-C, a plurality of kiosks 14A-C, and a plurality of mobile computing devices 16A,B that may all exchange data via a wired or wireless communication network 17.

Figure 3:
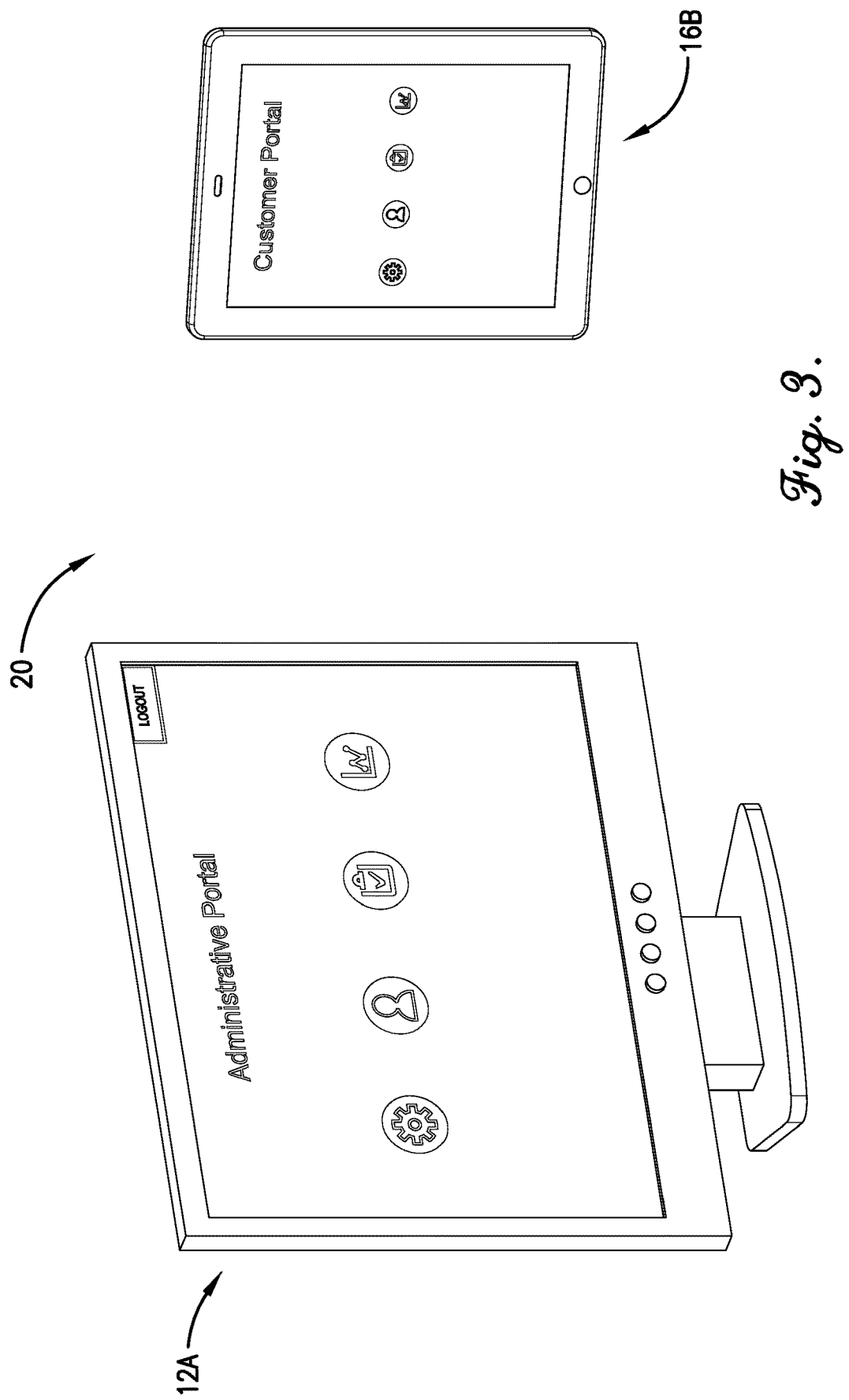
FIG. 3 is a set of screen displays of a platform configured to be run on the computing devices and kiosks of FIG. 2.
Figure 4:
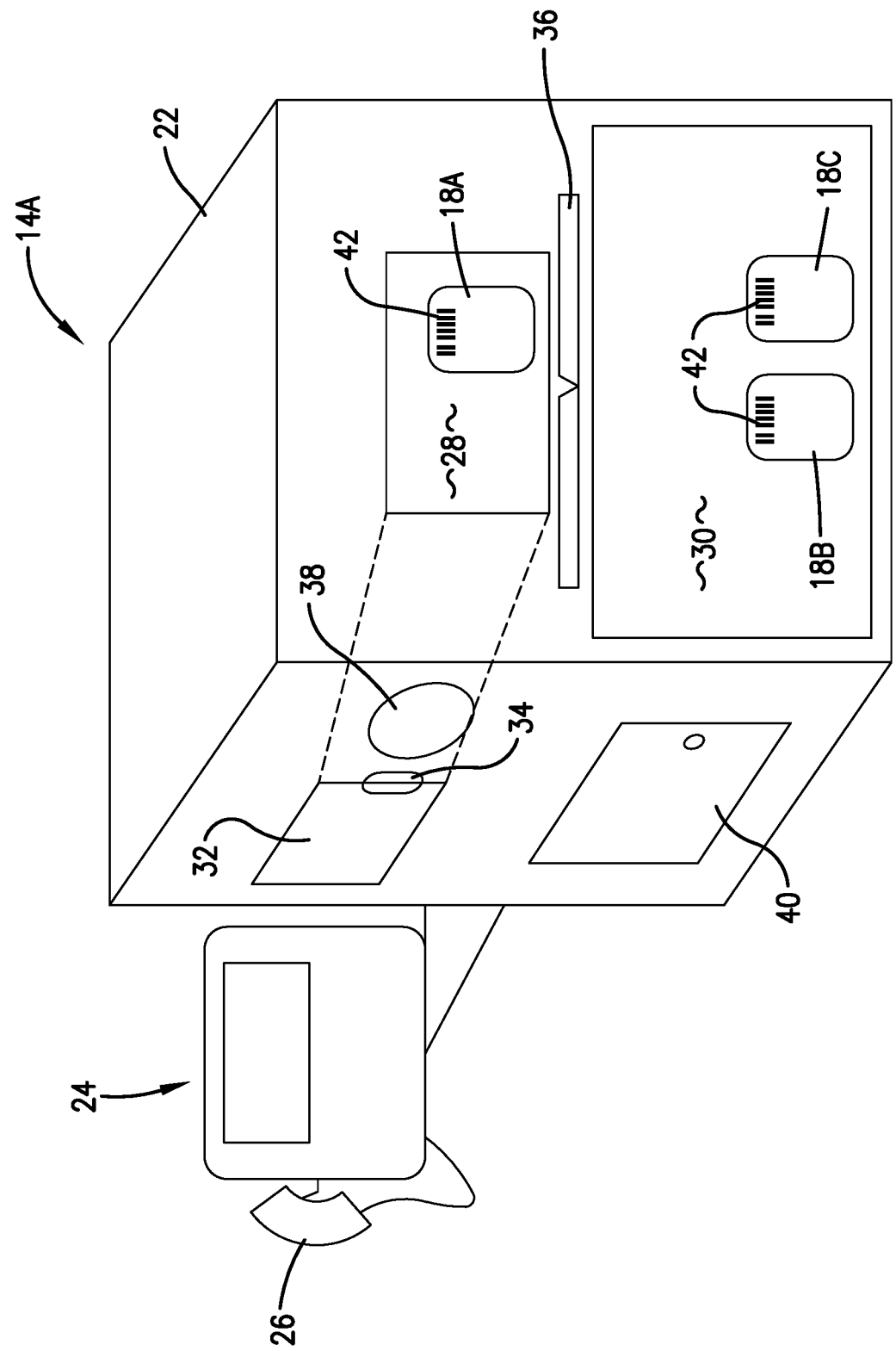
FIG. 4 is a schematic representation of the kiosk of FIG. 1 and other embodiments of the kiosk.

As best shown in FIG. 4, each of the kiosks 14A-C may securely receive and track a number of document containers 18A-C in which documents and/or other items may be placed. As depicted in FIG. 3, the system 10 runs a platform 20 which may be accessed by the support computing devices 12A-C and the mobile computing devices 16A,B for user accounts and system support. The system 10 and platform 20 are described in terms of document shredding but may be used for the disposal, destruction, or collection and tracking of other items such as unsold inventory, reusable packaging, confidential or proprietary devices, regulated material such as hazardous waste, and the like.

The support computing devices 12A-C support the kiosks 14A-C and the mobile computing devices 16A,B and are configured to run programs and/or store data and databases for implementing the function and operations described herein. The support computing devices may communicate with each other, the kiosks 14A-C, and the mobile computing devices 16A,B over the wireless or wired communication network 17. The support computing devices may be physically located at a remote support site such as an offsite platform provider, support office, server farm, etc. The support computing devices may be developer workstations, helpdesk workstations, backend servers, and the like. Although three support computing devices 12A-C are illustrated, the system 10 may include any number of such computing devices.

The kiosks 14A-C receive, store, and track containers in which documents and other items that are to be shredded or otherwise securely destroyed are placed and may be located anywhere such as in or near store entrances, in libraries, on public sidewalks, etc. The kiosks may also be located in private areas where use is restricted to particular users such as a business's employees.

Figure 1:
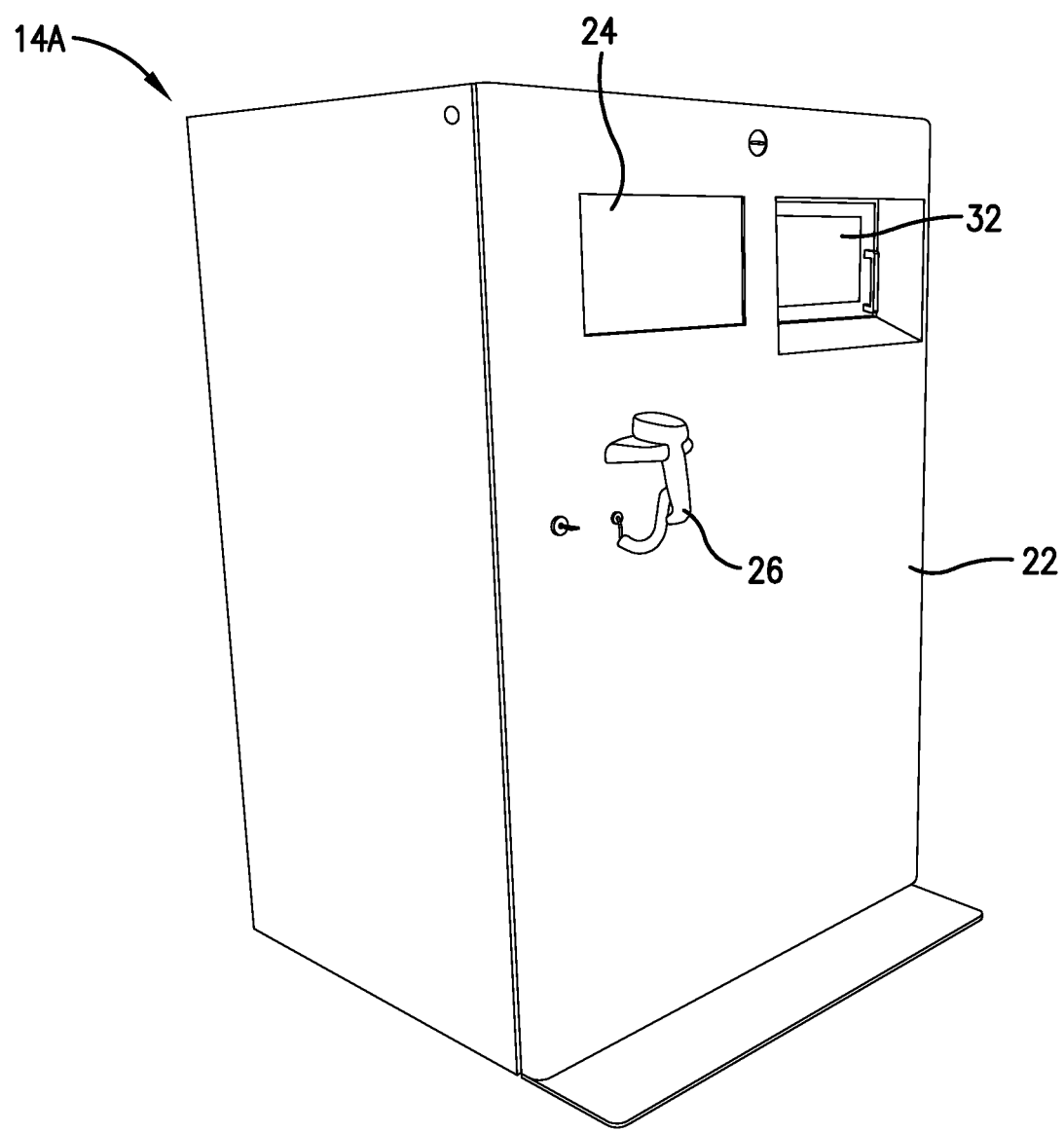
FIG. 1 is a perspective view of a kiosk constructed in accordance with an embodiment of the invention.

All the kiosks 14A-C are the same or similar so only kiosk 14A will be described in detail. An embodiment of the kiosk 14A is shown in FIGS. 1 and 4 and may include a lock box 22, a kiosk computing device 24, and a scanner 26.

As best shown in FIG. 4, the lock box 22 includes a deposit compartment 28, a secured receptacle 30, a door 32, a locking mechanism 34, a deposit actuator 36, a viewing portal 38, and a service access door 40. The lock box 22 is preferably integrated with the other components of the kiosk 14A but may also be a separate component.

The deposit compartment 28 receives document containers 18 via the door 32 and temporarily retains them until the deposit actuator 36 allows the document containers 18 to drop into the secured receptacle 30. To that end, the deposit compartment 28 may be positioned above or higher than the secured receptacle 30. Exemplary document containers 18 are discussed in more detail below.

The secured receptacle 30 receives document containers 18 from the deposit compartment 28 and may be a bin, a box, a bag, or the like. The secured receptacle 30 retains the document containers 18 until the kiosk 14A is serviced via the service access door 40.

The door 32 allows users to deposit document containers into the deposit compartment 28 only when the locking mechanism 34 is unlocked. The door 32 may be a lid, a front-facing hinged panel, or the like. The door 32 may automatically lock when shut.

The locking mechanism 34 secures the door 32 in a closed position and may be a latch, a deadbolt, a lock bar, a magnetic lock, or the like. The locking mechanism 34 may be electronically activated via the kiosk computing device 24 or may be manually activated.

The deposit actuator 36 is a moveable plate, lever, or door positioned between the deposit compartment 28 and the secured receptacle 30 that can be opened to allow document containers to drop into the secured receptacle. The deposit actuator 36 may be controlled by the kiosk computing device 24.

The portal 38 is a viewing window that provides a line of sight into the deposit compartment 28. The portal 38 allows for visual confirmation that any document container in the deposit compartment 28 has dropped into the secured receptacle 30. Alternatively, a camera and electronic display may be used to provide visual confirmation.

The service access door 40 is a secondary door or panel that can be opened only when the kiosk 14A is being serviced by authorized personnel. The service access door 40 may be accessible from the front, back, or sides of the kiosk.

The kiosk computing device 24 may communicate with the other kiosk computing devices in other kiosks, the support computing devices 12A-C, and the mobile computing devices 16A,B over the wired or wireless communication network 17. The kiosk computing device 24 may be a desktop computer, tablet computer, mobile computing device, or a special purpose electronic device. The kiosk computing device 24 may be located within or on the lock box or may be positioned remotely from the lock box.

The scanner 26 is configured to generate computer-compatible signals from ID markings on the document containers 18A-C. The scanner may be a bar code scanner, a laser, a camera, or the like. The scanner may be a stationary component integrated into the kiosk 14A or may be a handheld wand or gun.

The mobile computing devices 16A,B may be used by persons interacting with the kiosks and are operable to scan or otherwise read the ID markings on the document containers 18. The mobile computing devices may communicate with each other, the support computing devices 12A-C, and the kiosk computing devices 24A-C over the wired or wireless communication network 17. The mobile computing devices may be smartphones, tablet computers, laptop computers, electronic personal assistants, pagers, or any other portable electronic device. Although two mobile computing devices are shown, any number may be used.

The computing devices 12A-C, 16A,B, and 24 may include processors, memory elements, communications elements, and other electronic components and are configured to implement programs, applications, widgets, and interfaces of the present invention.

The processors in the computing devices 12A-C, 16A,B, and 24 may include electronic hardware components such as microprocessors (single-core and multi-core), microcontrollers, digital signal processors (DSPs), field-programmable gate arrays (FPGAs), analog and/or digital application-specific integrated circuits (ASICs), or the like, or combinations thereof. The processors may generally execute, process, or run instructions, code, code segments, software, firmware, programs, applications, apps, processes, services, daemons, or the like. The processors may also include hardware components such as finite-state machines, sequential and combinational logic, and other electronic circuits that can perform the functions necessary for the operation of the current invention.

The memory elements in or coupled with the computing devices 12A-C, 16A,B, and 24 may be any computer-readable non-transitory medium that can store a program for use by or in connection with an instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The communications elements in the computing devices 12A-C, 16A,B, and 24 allow the processors to communicate with processors of other computing devices over the communications network. The communications elements may include signal or data transmitting and receiving circuits, such as antennas, amplifiers, filters, mixers, oscillators, digital signal processors (DSPs), and the like.

The document containers 18A-C receive documents and other items to be shredded or otherwise destroyed and include computer-readable ID markings 42. The containers may be sealable bags, boxes, tubes, envelopes, bins, or the like. The document containers 18A-C may be formed in a variety of sizes so as to enclose different sizes and amounts of documents and other items.

The ID markings 42 may be printed, engraved, etched, or stamped on the document containers 18A-C, printed on labels that adhere to the document containers 18A-C, or printed on tags attached to the document containers.

The platform 20 facilitates tracking and managing destruction of documents and allows for backend support of the system 10. To those ends, the platform 20 may include or enable a public website, an administrative portal, and a customer portal (accessible via a mobile application).

The public website may provide user support, useful information such as kiosk location and availability, and troubleshooting. The public website may also provide general information about the system 10 and platform 20. Additionally, other portals such as a portal for commercial customer tracking of returned merchandise or packaging, a shred vendor partner portal, a business customer portal, a retail partner portal, and a fulfillment and distribution partner portal may be provided.

The administrative portal provides platform and kiosk administrators access to operational data and document disposal data. The administrative portal may be accessible to the administrators via the support computing devices 12A-C as depicted in FIG. 3. The administrative portal may be used to manage most aspects of the platform 20, although some aspects such as paying shredding partners may be managed outside of the platform 20. An administrator logging into the administrative portal may first see a dashboard that provides general information important to day-to-day operations of the system 10. The dashboard may provide widgets for offline kiosks and kiosks needing service and may indicate capacity and location of each kiosk. It may also provide important daily data and a link to all other portals.

A "shred partners" section may be used to add, update, and deactivate partners to the system 10. Each partner entry in the partner section may have attributes such as name, mailing address, point of contact (name, phone, email, etc.), and notes. Along with these editable attributes, the administrative portal may provide a list of kiosks that have been assigned to each partner. The list of kiosks may present data such as date and time of last service and total number of document containers that have been deposited since the last service.

A kiosk section may be used to add, update, deactivate, and lock down kiosks. Each kiosk entry in the kiosk section may have attributes such as a serial number, a description, a location name (for displaying the kiosk on a map), an address, a shred partner, a private/public toggle, and notes. Only public kiosks will be displayed on the map. The administrator may lock down a kiosk (optionally to lock out a customer, to service the kiosk, or both) and implement a manual service override to set a date and reset a document container count to zero. The administrator may also be able to view a kiosk dashboard that indicates any errors that have occurred at that kiosk, the last date or time service was performed on that kiosk, a total number of document containers that have been deposited at that kiosk, a number of document containers deposited at that kiosk since its last service, and/or a feed of all the activities that have happened at that kiosk. It may also provide a link to service history including date, servicing tech, document containers removed listed by bar code and pictures of servicing tech.

A business entity may purchase document containers 18A-C from the system provider to distribute to customers or employees. Before sending the document containers to the business entity, the system provider may associate individual document containers to the business in a database via the ID markings. This can be achieved one of several ways. For example, document container barcodes may be directly attached to a business entity or a barcode/numbering scheme may be used where the first three characters of the barcode indicate the business entity. A code such as "000" may indicate a retail bag. Three alpha-numeric, case-sensitive characters allow for the entry of 226,981 businesses. Alternatively, a fulfillment vender or internal fulfillment department with the ability to manage the relationship between business entities and barcodes may provide a spreadsheet to the system provider to upload to the support computing devices 12A-C. Or the system provider may scan each document container that will be sent to business entities to record the associate in the database.

A business section may be used to add, update, and deactivate businesses from the system 10. A business entity entry may include attributes such as business name, mailing address, point of contact, and notes. Along with these editable attributes, a list of document containers 18A-C assigned to the business entities may include attributes such as status, date, and time when the document container was deposited, and an individual registered to the document container if applicable. A business entity dashboard may also be used to view a total number of document containers sent to each business entity and a number of document containers deposited in a kiosk as well as the location the of the kiosk where the document container was deposited. The dashboard may also indicate kiosks assigned to each business.

Customers may use the kiosks 14A-C by registering with one of the support computing devices. An administrator may be able to assist registered customers with their accounts by navigating to a "customers section" of the administrative portal. From a customer's page, the administrator may update attributes such as customer name, email, phone number, and notes. Along with these editable attributes, the administrator may view a list of document containers that have been registered by the customer. The list of document containers may include attributes such as status, date, and time the document container was deposited, and the employee or other individual registered to the document container if applicable. The administrator may also perform actions on the customer's account including resend a "welcome/confirmation" email, reset a password, and deactivate the account. Usage without registering may require disclaimers and use of a different document container.

A document container section may be used to view a full inventory list of document containers 18A-C. The list may include attributes such as a barcode number, a status, a status date and time, a business if applicable, a customer if applicable, a kiosk if applicable, and a shred partner if applicable. The administrator may also see further details of each document container and perform actions associated with the document container such as assign the document container to a business, a customer, and a kiosk, and invalidate the document container. The administrator may also view a feed of each step the document container has gone through with a date/time stamp for each step. The administrator may also upload a spreadsheet of document containers to add to the system 10. An optional column in the spreadsheet may associate the document container to a specific kiosk.

Reporting may be made via a datasheet component in the administrator portal that allows data to be presented on the page for sorting, filtering, and exporting to a datasheet program. Datasets that may be available include a list of document containers, kiosk statistics, business statistics, business details, and customer details.

The customer portal allows platform users to create and manage accounts and purchase and register document disposal containers that have not been registered, view status of document disposal containers, view receipts of deposit, view certificates of deposit, view kiosks locations, and view security topics. As depicted in FIG. 3, the customer portal may be accessible on the kiosk computing devices 24A-C and on the mobile computing devices 16A,B via a mobile application. The customer portal may be web-only or may utilize a progressive web app framework. The customer portal may be both a secure web app and a native mobile app the customer may download from app stores (e.g., Android® and Apple® app stores).

Figure 5:
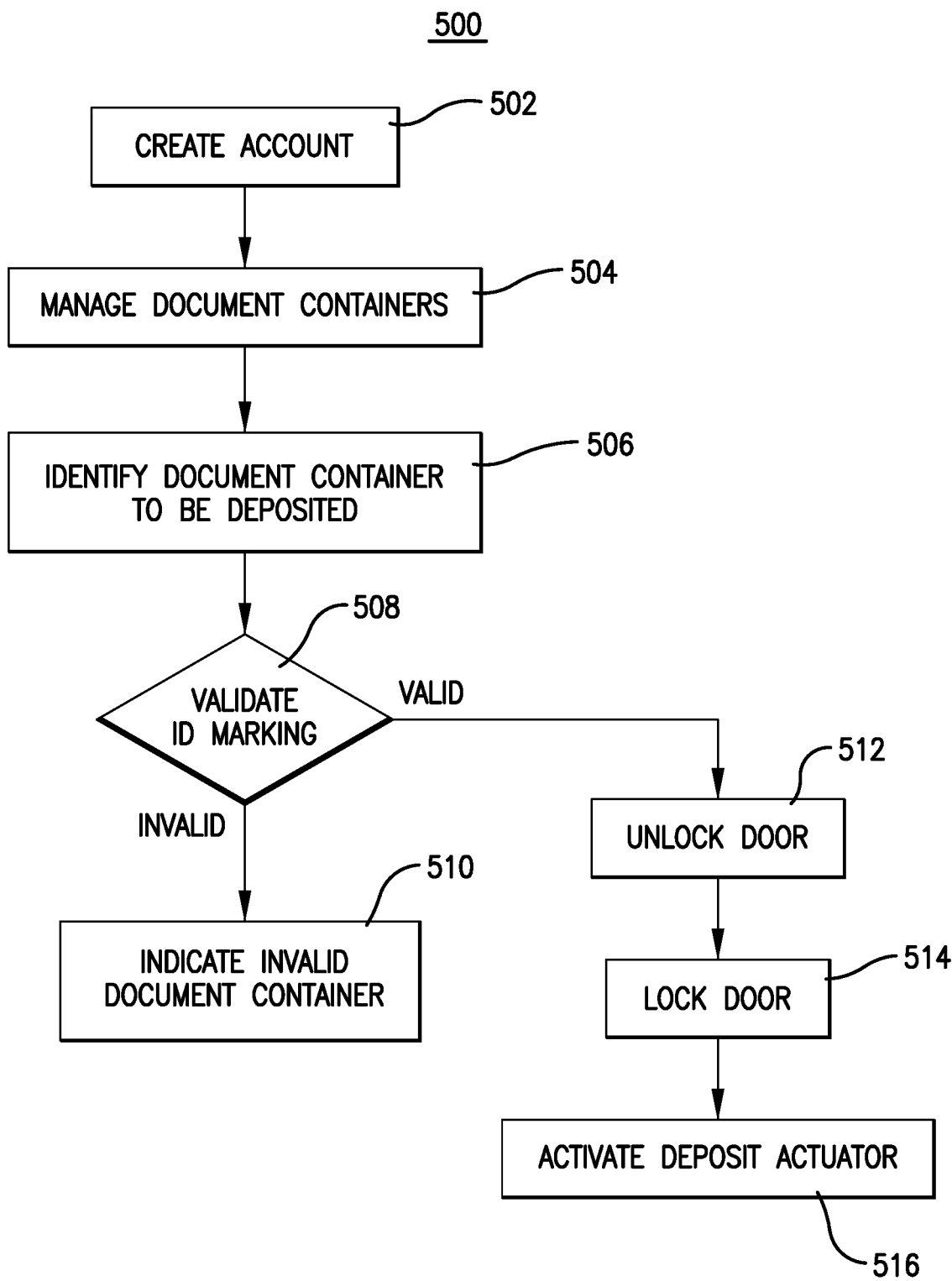
FIG. 5 is a flow diagram depicting exemplary steps of a method according to an embodiment of the invention.

Turning to FIG. 5, a method 500 of using the system 10 will now be described in more detail. First, a customer opens or otherwise accesses the customer portal via the computer device 16B or another device and is prompted to log in or create an account, as shown in block 502. A touchscreen display or other user interface on the kiosk may also permit local creation of accounts and/or log-ins. The customer portal may send the customer a welcome email to set up a password, or this may be done locally on the kiosk. Once authenticated, the customer may see a simple home page that allows the customer to toggle between the latest news/tips on how to secure privacy and data. The customer may view inventory assigned document containers 18A-C, deposit receipts and Certificate of Destructions, and additional buttons to view latest news and tips, a kiosk location map, and a link to buy document containers. The customer can register unregistered document container to their account by scanning associated bar codes.

Signing up for an account allows the customer to receive notifications via text, email, mobile push notification, or a combination thereof. With an account, the customer will receive an official certificate of receipt for document containers 18A-C deposited and a Certificate of Destruction after they are destroyed. The customer may also received instant instore coupons and offers from retailers at the location of deposit. A list of all of the customer's registered document containers and their current statuses and history may be available via the customer portal.

Document containers 18A-C may be registered when purchased. Document containers that have not yet been assigned to an account, such as document containers handed out at promotional events or purchased at a retail store, may need to be scanned into the customer's account. In one embodiment, to manage the document containers (as shown in block 504), the customer may either scan the ID marking with the mobile application or enter a corresponding ID number on the customer website. The ID marking will be verified as being associated with an unused document container and the customer's account. If the document container has a designated kiosk, a location of the designated kiosk will be shown.

Use of the kiosks 14A-C may be pay-per-use, subscription/plan based, or both. Revenue may also be generated by advertising presented on the display screens of the kiosk, kiosk body, documents containers and computing devices. Additional services may also be bundled with the purchase of the document container. The kiosk computing devices 24 may step users through a document disposal process with on-screen graphics such as demonstrative gifs or images. A kiosk may prompt the user to scan the ID marking 42 on the document container to be deposited through the use of a touch screen button, a start button on the kiosk, or motion detected by the scanner 26, as shown in block 506.

The kiosk computing device 24 may then take a picture of the depositor and validate the ID marking, as shown in block 508. Specifically, the kiosk computing device 24 may receive input from the scanner 26 and then transmit an authorization token, a kiosk serial number, a barcode number, a status, a date and time, or any other identification information to one of the support computing devices 12A-C. The support computing device may then indicate to the kiosk computing device 24 whether the document container is valid or not. Once a container has been validated and deposited, its ID markings can no longer be used.

If the document container 18A-C is not valid, the kiosk computing device 24 may display a message indicating the document container is not valid and may provide registration steps or a process for depositing non-registered document containers, as shown in block 510. If the document container is valid, the kiosk computing device 24 may instruct the locking mechanism 34 to unlock the door 32, as shown in block 512. The locking mechanism 34 will only unlock after a valid identification marker has been scanned.

The user may then open the door 32 and place the document container into the lock box 22. The door 32 may then automatically lock, as shown in block 514. The kiosk computing device 24 may then confirm the document container is in the lock box 22 and the door 32 is closed via cameras or other sensors. The system compartment camera may then take a picture of the deposited document container to verify the deposit was a document container. The kiosk computing device 24 may then communicate to the support computing devices 12A-C that the document container was received.

If a document container is not identified, the kiosk computing device 24 may reset and wait for valid ID markings to start the process over. The kiosk computing device 24 may ask the user to verify that no documents were unintentionally omitted and that the kiosk 14A received the document container correctly (i.e., the kiosk 14A did not malfunction) by pressing a confirmation button. The kiosk computing device 24 may then instruct the locking mechanism 34 to lock the door 32, as shown in block 514. The document container cameras or sensors will identify if a document container has been placed in the compartment. If not, it will return to the previous step and start the process over. If a valid document container has been placed in the compartment, the kiosk 14A activates the deposit actuator 36 so the document container drops into the secured receptacle 30, as shown in block 516. The document container camera or other sensors will verify the document container has dropped in the compartment. If the document container successfully dropped into the secured receptacle 30, the actuator closes. The kiosk computing device 24 may then indicate onscreen and to the support computing device or the user's mobile device via text or email that the document container has been successfully deposited in the kiosk 14A. With the instant deposit notification, the customer may receive other notices such as coupons and other retail incentives. If the document container did not drop, the kiosk will prevent any further actions and send a error signal to the admin portal.

If the user has signed up for an account and has registered the document container 18A-C, or if the document container has been associated with a business, the kiosk computing device 24 (or one of the support computing devices 12A-C) may send an email or other notification to the user confirming receipt with a certificate of receipt document attached to the notification.

The kiosk computing device 24 (or another computing device) may indicate whether any of the above steps, requests, or actions have been successful or not. If not, the kiosk 14A may display a message to the user and send a notification to the administrative portal. The kiosk computing device 24 may ping the locking mechanism 34 or other components until a response is received that a step has been successful. The kiosk computing device 24 may then proceed to a subsequent step or action.

All communications with the support computing devices 12A-C may be saved to a database (such as an SQL Server Express database) running on the kiosk computing device 24. If a call to the support computing devices 12A-C is unsuccessful, the call will be retried at a later time and will assume a success response to give the user the best possible experience at the kiosk 14A.

Each kiosk is serviced at regular intervals, at which time the document containers 18A-C in the lock box 22 will be removed from the deposit compartment 28 and transferred to a document disposal vehicle. At the time of removal, a service event file will be recorded. The service event file may include a time and date stamp and a picture of the servicing tech. The service tech will be required to scan a valid service tech bar code to open the service door. Unauthorized attempts to access the kiosk will trigger alarms. The document containers may then be destroyed via a shredder in the document disposal vehicle or at an offsite facility. For embodiments in which returnable items are deposited, the vehicle may be used to return the items to the contracting business. When a kiosk is serviced, the administrative portal updates the inventory in the kiosk. For example, the inventory may reset to a count of zero. Statuses of the document containers may change based on their new location or actual status.

The platform 20 may be encrypted via SSL or other suitable encryption protocol. Users may need to be authenticated to use the system 10. Authorization may be used to restrict access to only areas of the system 10 to which the user has been granted permission. Teams may be created and configured with specific permissions. Users may be assigned to a team that will grant the user the team permissions, but the administrator may customize these teams for particular users. The teams and permissions may be broken into system administrators and customers. System administrators may have full control of everything in the administrative portal with ability to add, update, delete, and view all entities, including teams and users. Customers may have the ability to log into a customer portal, register document containers, and view registered document containers.

The above-described system 10 and platform 20 provide several advantages. For example, the system 10 provides a network of interconnected conveniently located kiosks for secure trackable document destruction services for residential and commercial clients to dispose of and destroy financial statements, bank statements, tax documents, receipts, medical records, mail, notes, schoolwork, office records, electronic storage devices, and disposable pharmaceutical drugs. The system provides documented proof of use for the user. The system 10 also monitors remote employee compliance with employer document shredding policies. The system 10 thus provides reverse vending specifically for verified disposal of selective individual parcel identification.

Figure 6:
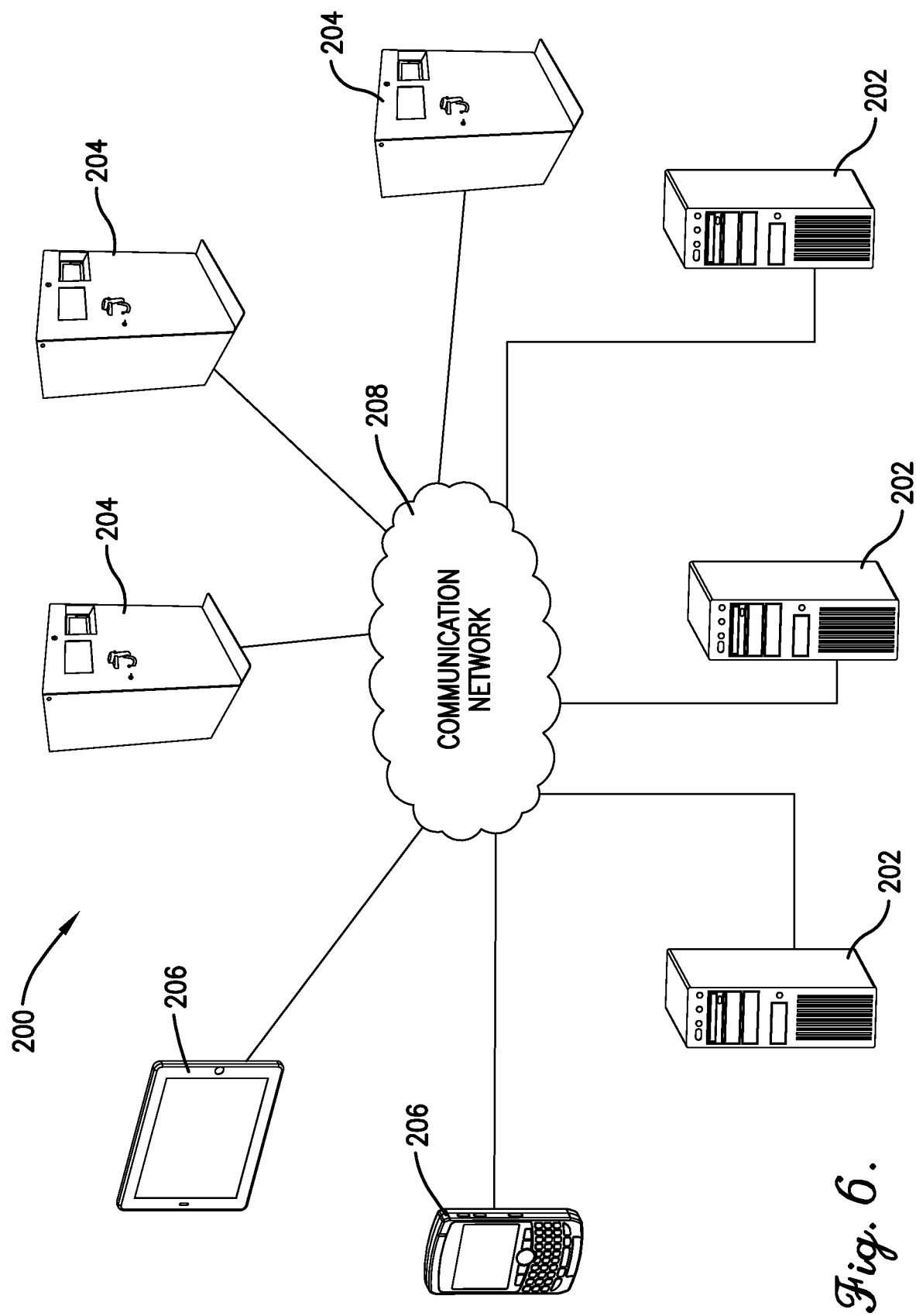
FIG. 6 is a schematic diagram of computing devices and kiosks that are part of a ballot collection and hacking system in accordance with another embodiment of the invention.

A system 200 for collecting and tracking election ballots in accordance with another embodiment of the invention is illustrated in FIG. 6. The system 200 broadly comprises a plurality of support computing devices 202, a plurality of kiosks 204, and a plurality of mobile computing devices 206 that exchange data via a wired or wireless communication network 208. The system 200 runs a platform similar to platform 20 described above for user accounts and system support. Ballots to be deposited in a kiosk 204 may be placed in document containers with computer-readable ID markings. Or ID markings may be printed directly on the ballots.

The support computing devices 202 are configured to run programs and/or store data and databases to support the kiosks 204 and mobile computing devices 206. The support computing devices may communicate with each other, the kiosks 204, and the mobile computing devices 206 over the communication network 208. The support computing devices may be physically located at a remote support site such as an offsite platform provider location, support office, or server farm. The support computing devices may be developer workstations, a helpdesk workstations, backend servers, and the like. Although three support computing devices are illustrated, any number may be provided.

Figure 7:
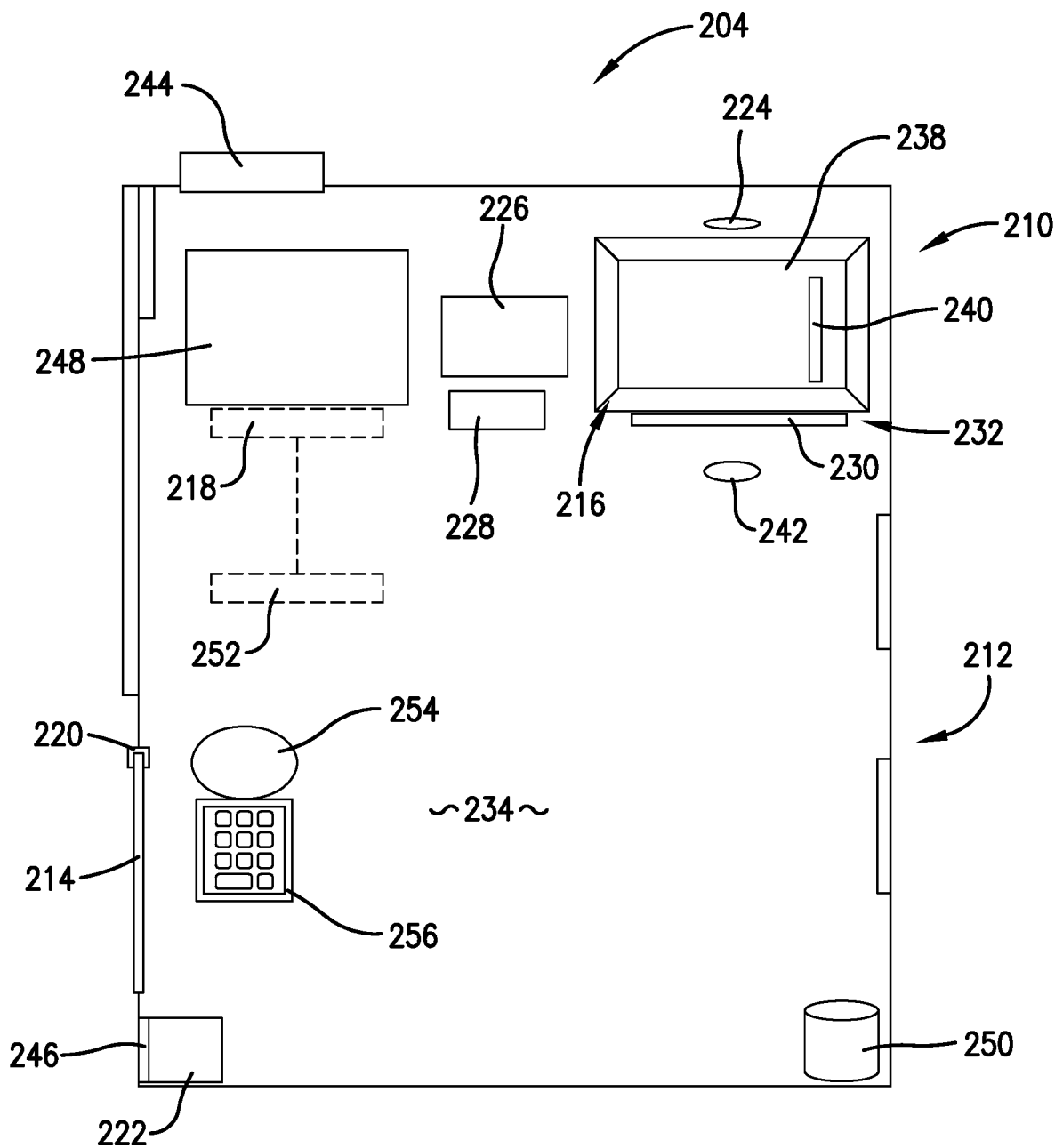
FIG. 7 is a schematic representation of an exemplary kiosk that may be used with the system of FIG. 6.

An embodiment of a kiosk 204 is shown in FIG. 7 and may include an upper section 210, a lower section 212, an access door 214 with a door lock 220, a deposit compartment 216, a computer 218 with a monitor 248, and a power source 222. The kiosk 204 may be located in a public area such as a store entrance, library, on a sidewalk, an atrium, or the like.

The upper section 210 houses the deposit compartment 216 and certain components of the computer 218. One or more cameras 224, a barcode scanner 226, and an RFID sensor 228 are positioned on the front of the upper section 210. One of the cameras 224 may be aimed into the storage area, and another camera may be aimed at the user or elsewhere. An internal bag scale 230 may be positioned in the deposit compartment, and an actuator 232 is below the deposit compartment.

The lower section 212 is directly below the upper section 210 and defines an internal storage compartment 234 for securely holding items deposited in the kiosk. The internal storage compartment 234 receives document containers from the deposit compartment 216 and may hold a bin, a box, a bag, or the like. The internal storage compartment 234 retains the document containers until the kiosk 204 is serviced. In one embodiment, the lower section 212 includes two separate deposit compartments that drop into two separate internal storage compartments to collect different types of material.

The access door 214 provides access to the internal storage compartment 234 of the lower section 212 and may be connected via internal hinges. Internal hinging prevents tampering with or removal of the door 214 when the door 214 is closed. The door 214 may also provide access to the upper section 210. Alternatively, a separate door may provide access to the upper section. If one door is used, the front of the kiosk 204 may include a single door panel. If two doors are used, access via one door does not provide access via the other door.

The door lock 220 communicates with an RFID sensor 254 and a keypad 256 for providing access to the internal storage compartment 234. The door lock 220 may also include an alarm configured to generate an audible or visual alert when the door lock 220 is compromised or when unauthorized access is detected. The door lock 220 may also send a signal to the processor of the computer 218 indicating the door lock is compromised or unauthorized access is detected. The signal may also be transmitted to the support computing devices 202.

The RFID sensor 254 may sense a service technician badge to allow service access to the internal storage compartment 234. The keypad 256 allows a service technician to enter a keycode to gain access to the internal storage compartment 234. Both may be required to gain access.

The deposit compartment 216 receives ballots, document containers, and other items and includes a locking door 238 with a handle 240. A second camera 242 may be positioned adjacent the door. A window or portal may be formed in the door 238 for viewing ballots deposited in the deposit compartment 216.

The locking door 238 prevents access to the deposit compartment 216 once ballots, document containers, or other items are deposited in the kiosk. The locking door 238 may automatically lock and unlock.

The handle 240 allows a user to open the locking door 238 to deposit ballots in the deposit compartment 216. Alternatively, the locking door may open automatically when access is granted and close automatically when access is terminated.

The camera 242 points into the deposit compartment 216 and is configured to take a picture of ballots, document containers, and other items as they are deposited in the kiosk to assist with validating items placed in the compartment. The camera 242 may also be configured to send an image to the monitor 248 for showing items as they drop into the internal storage compartment 234.

The camera 224 is configured to take pictures of depositors and service technicians. To that end, the camera 224 maybe outward facing and may be inconspicuous.

The barcode scanner 226 is configured to scan bar codes of ballots. The barcode scanner 226 may include a handheld wand or gun-type component for simplifying scanning.

The RFID sensor 228 senses unique RFID tags for tracking the ballots. The RFID sensor 228 may be positioned near the barcode scanner 226 to ensure RFID tags are sensed during barcode scanning.

The internal bag scale 230 is positioned under or at the bottom of the deposit compartment 216. The internal bag scale 230 weighs ballots, document containers, or other items deposited in the deposit compartment 216 to validate/confirm items placed in the compartment.

The actuator 232 may be a lever or door that opens between the deposit compartment 216 and the internal storage compartment 234. The actuator 232 may be controlled by the computer 218.

The computer 218 may include or be coupled with a modem 244, an ethernet connection 246, the monitor 248, and/or a GPS tracking component 250. The computer 218 has a processor and may be a desktop computer, tablet, mobile computing device, or the like.

The modem 244 connects the computer 218 to the support computing devices 202, other kiosks 204, and the mobile computing devices 206 via the network 208. The network 208 may be the internet, a local area network (LAN), a telephone network or the like. Alternatively, the network may include an antenna, a cellular device, or the like for wireless data transfer.

The monitor 248 displays information and images to users. For example, the monitor 248 may display instructions, confirmations, animations, and images taken by the cameras 224, 242. The monitor may also include a human-machine-interface (HMI) touch screen for receiving inputs and commands from the user.

The GPS tracking component 250 determines a location of the kiosk 204 via GNSS signals. The GPS tracking component 250 may be positioned for optimal satellite signal reception.

The processor 252 of the computer 218 controls the cameras 224, 242, barcode scanner 226, RFID sensors 228, 254, locking door 238, actuator 232, keypad 256, and GPS tracking component 250. The internal processor 252 also communicates with the support computing devices 202, the other kiosks 204, and the mobile computing devices 206.

The power source 222 provides electrical power to the kiosk 204 and may be a wall plug, battery, uninterrupted power supply cups, or the like. The ethernet connection 246 connects the modem 244 to an internet cable, a LAN cable, a telephone cable, or the like.

The mobile computing devices 206 are used by voters or other persons and can be used to scan ID markings on ballots, document container, and the like. The mobile computing devices may communicate with the support computing devices 202 and the kiosks 204 over the network 208. The mobile computing devices may be smartphones, tablets, electronic personal assistants, pagers, or any other handheld electronic devices. Although two mobile computing devices are shown, any number of mobile computing devices may be used.

All of the above-described computing devices may include processors, memory elements, communications elements, and other electronic components configured to store and implement programs, applications, widgets, and interfaces of the present invention.

The processors may include electronic hardware components such as microprocessors (single-core and multi-core), microcontrollers, digital signal processors (DSPs), field-programmable gate arrays (FPGAs), analog and/or digital application-specific integrated circuits (ASICs), or the like, or combinations thereof. The processors may generally execute, process, or run instructions, code, code segments, software, firmware, programs, applications, apps, processes, services, daemons, or the like. The processors may also include hardware components such as finite-state machines, sequential and combinational logic, and other electronic circuits that can perform the functions necessary for the operation of the current invention.

The memory elements may be any computer-readable non-transitory medium that can store a program for use by or in connection with an instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The communications elements allow the processors to communicate with processors of other computing devices over the communications network. The communications elements may include signal or data transmitting and receiving circuits, such as antennas, amplifiers, filters, mixers, oscillators, digital signal processors (DSPs), and the like.

Figure 8:
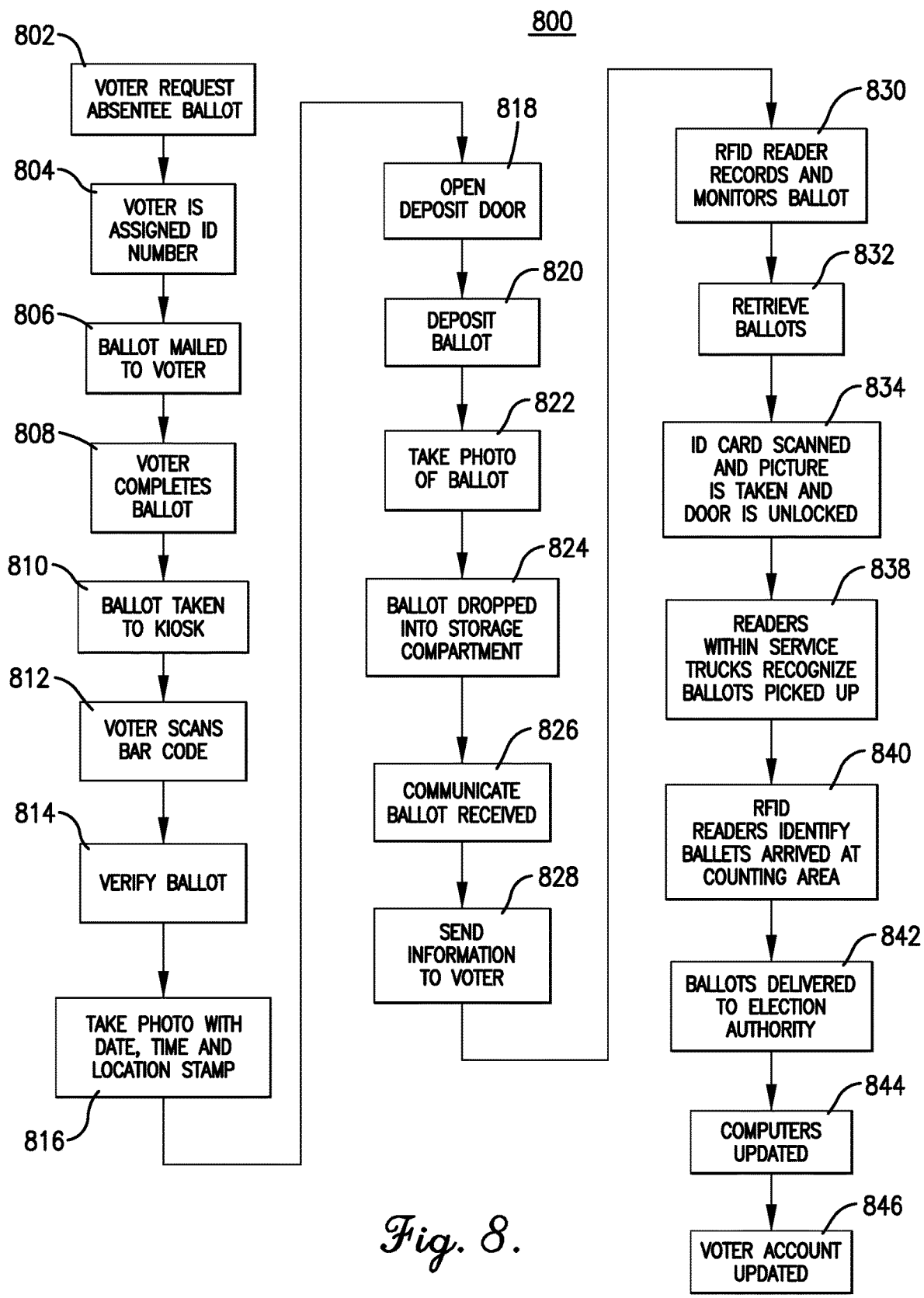
FIG. 8 is a flow diagram depicting exemplary steps of a method according to an embodiment of the invention.

Turning to FIG. 8, a method 800 of tracking voting ballots or other items via the system 200 will now be described. First, a voter may request or otherwise be assigned an absentee ballot, as shown in block 802. A voter ID number may then be assigned to the voter, as shown in block 804.

A ballot may then be mailed with a secrecy envelope including a bar code, as shown in block 806. A passive RFID tag may be attached to the ballot or an ID may be printed on the ballot. The bar code including the ID number and information from the RFID tag may be the only information that is transmitted to the system 200.

The voter may then complete the ballot, as shown in block 808. The voter (or an agent of the voter) may then take the ballot to one of the kiosks 204, as shown in block 810. In some embodiments, the voter may be instructed to take the ballot to a particular kiosk.

The voter or other legally authorized person then scans the bar code on the ballot or envelope, as shown in block 812. The kiosk 204 may then communicate with a computing device 202 to determine if the bar code is legitimate as shown in block 814. A picture may be taken of the person scanning the bar code, as shown in block 816. If the bar code is acceptable, the locking door 238 opens, as shown in block 818. The voter may then deposit the ballot in the kiosk, as shown in block 820.

The camera 242 may then take a picture of the ballot in the deposit compartment 216 as shown in block 822. Door lock automatically locks upon closing and sends signal the door is locked. The document container camera or sensors confirm the document container has been received. The actuator 232 may then activate to deposit the ballot in the internal storage compartment 234, as shown in block 824.

The kiosk 204 may then communicate to the support computing devices 202 that the ballot has been received as shown in block 826. The kiosk 204 may also send certain information such as a receipt or a confirmation to the voter indicating the ballot has been successfully deposited as shown in block 828. The RFID sensor 228 senses that the ballot has been received and triggers the kiosk 204 to monitor the location of the ballot as shown in block 830.

The kiosk 204 may be serviced when the kiosk 204 is full or at a predetermined service date as shown in block 832. To that end, a service technician may scan an ID card and take his picture to unlock the door 214, withdraw the ballots, and load the ballots in a service truck, as shown in block 834. Additional RFID readers located in the service truck may recognize individual ballots that are picked up as shown in block 836.

Other RFID readers may identify ballots that arrive at counting areas as shown in block 840. The ballots may then be delivered to an election authority as shown in block 842.

Databases of the support computing devices 202 may then be updated with information concerning the delivered ballots as shown in block 844. The voter's account may also be updated as shown in block 846.

Figure 9:
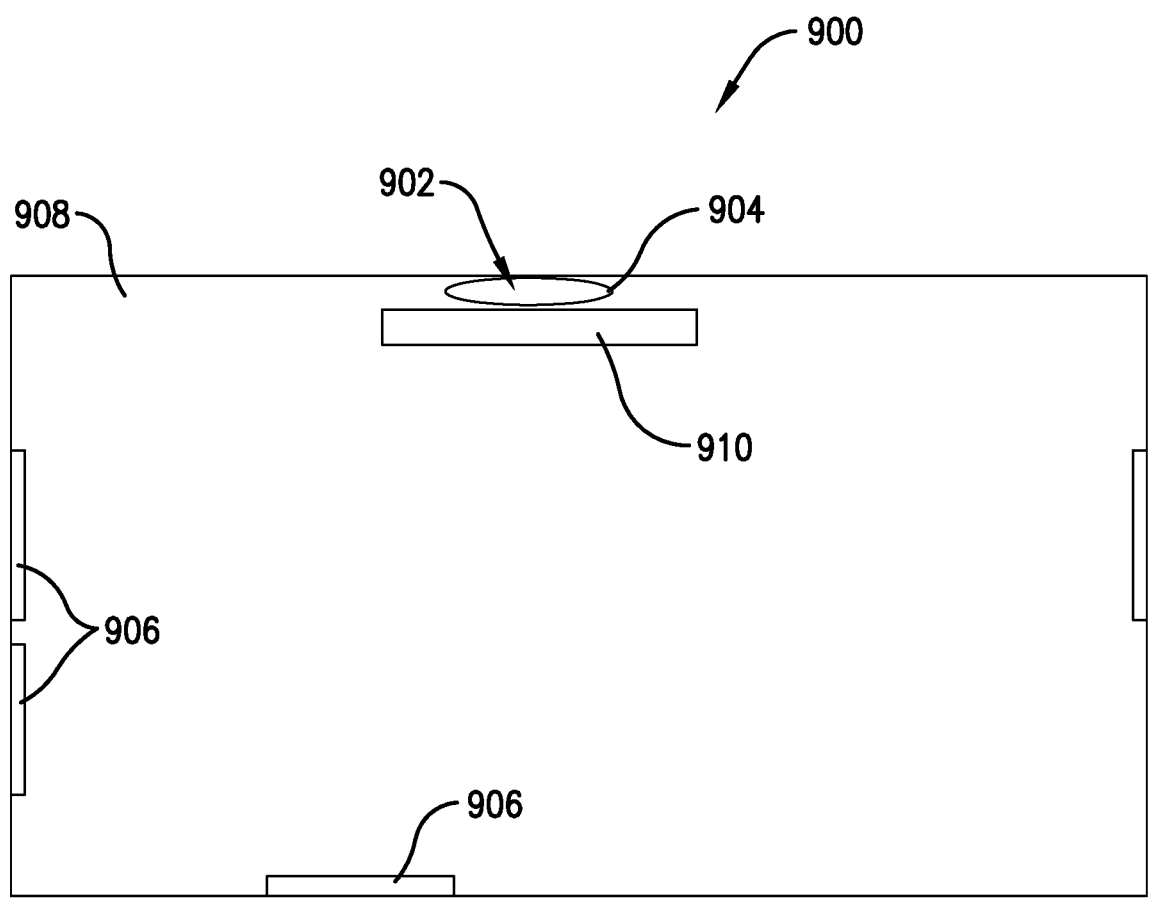
FIG. 9 is an elevational schematic view of a deposit compartment constructed in accordance with another embodiment of the invention.

Turning to FIG. 9, a deposit compartment 900 constructed in accordance with another embodiment of the invention is illustrated. The deposit compartment 900 comprises a deposit opening 902, an auto-lock 904, a plurality of drop openings 906, and a door 408. The deposit compartment 900 can be used with the above systems 100, 200 or similar systems.

The deposit opening 902 is positioned on or near a top side of the deposit compartment 900 and allows users to drop document containers or other items into the deposit compartment 900.

The auto-lock 904 disengages to provide access to the deposit opening 902 when a user scans a ballot, document container, or other item to be deposited. The auto-lock 904 also closes the deposit opening 902 after an item is dropped through the deposit opening 902.

The drop openings 906 allow document containers and other items to pass from the deposit compartment 900 to the storage compartment. The drop openings are closed off when the door 908 is open to prevent user access to the storage compartment.

The door 908 provides access to an internal storage compartment. The door 908 may include opposing hinges to rotate the door to an open position. The door may be auto-locked and auto-unlocked. The door may be manually opened and may automatically shut via gravity. As the door opens, an opening between an internal deposit compartment and the internal storage compartment may be closed.

Figure 10:
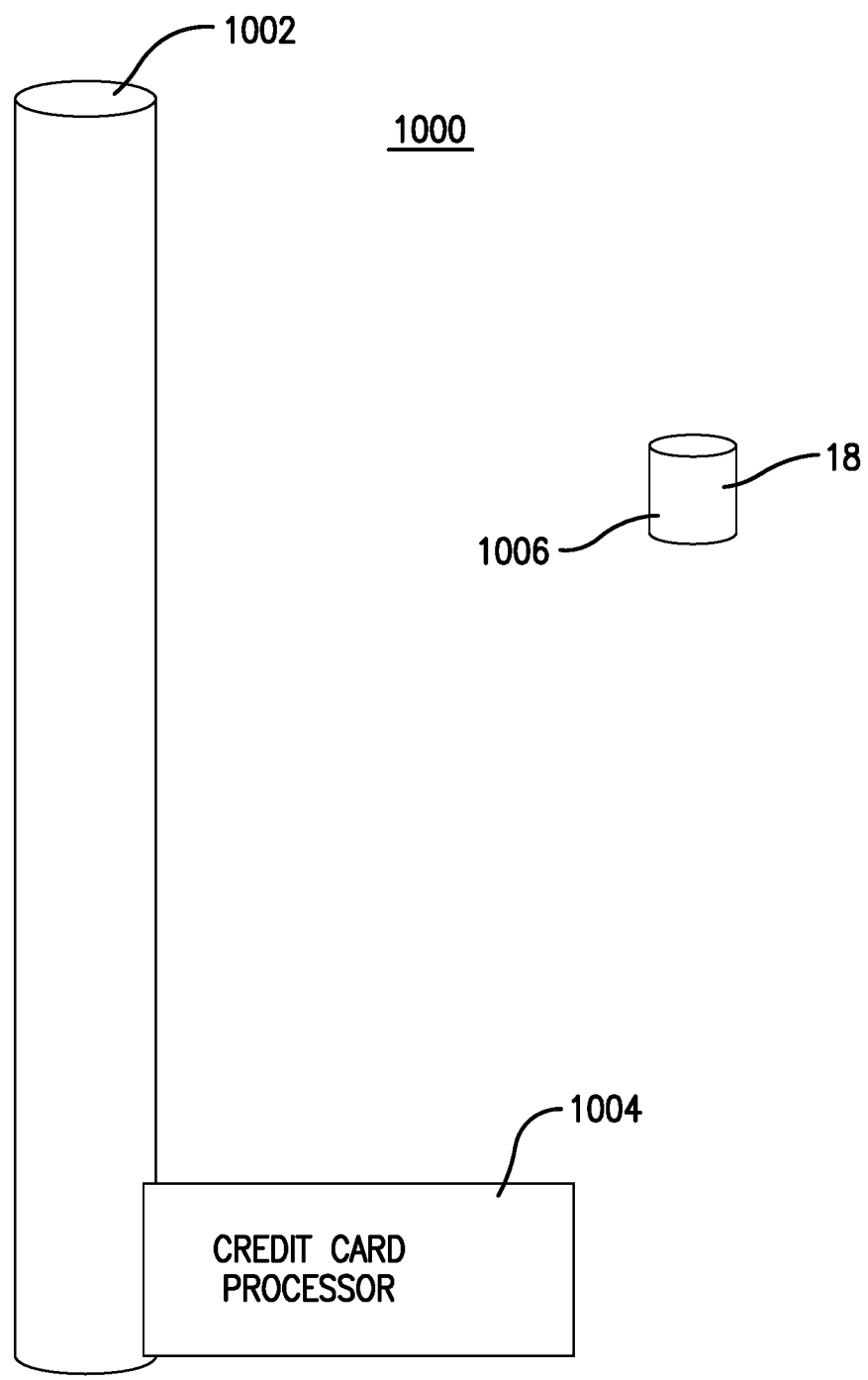
FIG. 10 a tube dispenser constructed in accordance with another embodiment of the invention.

Turning to FIG. 10, a tube or box dispenser 1000 configured to be used with the above systems 100, 200 is illustrated. The tube dispenser 1000 may be an elongated open-ended cylinder including a fill point 1002 and a credit card processor 1004. The tube dispenser 1000 may be configured to store and dispense document containers 18, bag holders 1006 and other items, and may be attached externally to one of the kiosks 204.

The credit card processor 1004 allows a user to purchase or rent a bag holder or other item and accepts payments via codes for users with accounts. The credit card processor 1004 may be communicatively coupled to the kiosks 204 or in independent communication with a credit card system.

A bag holder 1006 can be placed back in the tube dispenser 500 after use for a credit to the user's account. If the bag holder 506 is not returned, the user may be charged a fee.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of any claims deriving from application. The detailed description is to be construed as exemplary only and does not describe every possible embodiment since describing every possible embodiment would be impractical. Numerous alternative embodiments may be implemented, using either current technology or technology developed after the filing date of this application, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system and control systems, may be implemented as special purpose or as general purpose devices. For example, the processing system may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the terms "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing system to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Any patent claims deriving from this application are not intended to be construed under 35 U.S.C. § 112(f) unless traditional means-plus-function language is expressly recited, such as "means for" or "step for" language being explicitly recited in the claim(s).

Although the invention has been described with reference to the one or more embodiments illustrated in the figures, it is understood that equivalents may be employed and substitutions made herein without departing from the scope of the invention.

Having thus described one or more embodiments of the invention, patentable subject matter may include the following:

The invention claimed is:

1. A system for tracking document destruction or return, the system comprising:
   a kiosk comprising:

a scanner configured to scan document container data from a document container in which documents to be destroyed or returned are placed;
a lock box comprising:
a deposit compartment configured to receive and temporarily retain the document container;
a door configured to be opened for depositing the document container into the deposit compartment;
a locking mechanism configured to unlock the door upon receiving an unlock instruction;
a secured receptacle configured to receive the document container from the deposit compartment; and
a deposit actuator configured to selectively allow the document container to pass from the deposit compartment to the secured receptacle;
a kiosk computing device including a processor configured to run a program for instructing the locking mechanism to unlock and lock the door of the lock box, activating the deposit actuator to allow the document container to pass to the secured receptacle, and transmitting the document container data; and
a remote computing device comprising:
a communication element for receiving the document container data from the kiosk computing device; and
a processor configured to run a program for managing the document container data, the processor further configured to validate the document container data and send validation instructions to the kiosk computing device;
the kiosk computing device being configured to receive the validation instructions from the remote computing device and instruct the locking mechanism to unlock the door only if the document container data is valid.

2. The system of claim 1, the remote computing device being configured to run an administrative portal for managing the system.

3. The system of claim 1, the kiosk computing device being configured to run a customer portal for entering and managing the user information and document container data.

4. The system of claim 1, wherein the kiosk further comprises sensors to verify the document container has been placed in the deposit compartment.

5. The system of claim 1, wherein the kiosk is pay-per-use.

6. The system of claim 1, wherein the kiosk computing device monitors a status of the document container and sends corresponding status information to the remote computing device.

7. The system of claim 6, wherein the kiosk computing device sends the status information to mobile computing devices.

8. The system of claim 1, wherein the document container data includes an association to a business.

9. The system of claim 6, wherein the remote computing device maintains a history of the status of the document container and transmits corresponding status history information to the remote computing device.

10. The system of claim 1, wherein the system is configured to monitor whether a user has complied with a company document destruction policy.

11. A system for tracking document destruction or return, the system comprising: a plurality of kiosks located in a number of locations, each of the kiosks comprising:
a scanner configured to scan document container data from a document container in which documents to be destroyed or returned are placed;
a lock box comprising:
a deposit compartment configured to receive and temporarily retain the document container;
a door configured to be opened for depositing the document container into the deposit compartment;
a locking mechanism configured to unlock the door upon receiving an unlock instruction;
a secured receptacle configured to receive the document container from the deposit compartment; and
a deposit actuator configured to selectively allow the document container to pass from the deposit compartment to the secured receptacle;
a kiosk computing device including a processor configured to run a program for instructing the locking mechanism to unlock and lock the door of the lock box, activating the deposit actuator to allow the document container to pass to the secured receptacle, and transmitting the document container data; and
a remote computing device comprising:
a communication element for receiving the document container data from the kiosk computing device; and
a processor configured to run a program for managing the document container data the processor further configured to validate the document container data and send validation instructions to the kiosk computing device; and
a memory configured to store a database of the document container data, business information, and user information;
the kiosk computing device being configured to receive the validation instructions from the remote computing device and instruct the locking mechanism to unlock the door only if the document container data is valid.

12. The system of claim 11, each of the kiosks further comprising a camera for photographing the document container and a user when the user deposits the document container in the kiosk.

13. The system of claim 11, the remote computing device being configured to run an administrative portal for managing the system.

14. The system of claim 11, the kiosk computing device being configured to run a customer portal for entering and managing the user information and the document container data.

15. The system of claim 11, some of the kiosks being exclusively associated with a business.

16. The system of claim 11, at least one of the kiosks being pay-per-use.

17. The system of claim 11, wherein the kiosk computing device monitors a status of the document container and sends corresponding status information to the remote computing device.

18. The system of claim 17, wherein the kiosk computing device sends the status information to mobile computing devices.

19. A system for collecting and tracking ballots, the system comprising:
a kiosk comprising:
a scanner configured to scan ballot data from ballots or envelopes in which the ballots are placed;
a lock box comprising:
a deposit compartment configured to receive and temporarily retain the ballots;
a door configured to be opened for depositing the ballots into the deposit compartment;
a locking mechanism configured to unlock the door upon receiving an unlock instruction;

a secured receptacle configured to receive the ballots from the deposit compartment; and a deposit actuator configured to selectively allow ballots to pass from the deposit compartment to the secured receptacle;

a kiosk computing device including a processor configured to run a program for instructing the locking mechanism to unlock and lock the door of the lock box, activating the deposit actuator to allow a ballot to pass to the secured receptacle, and transmitting the ballot data; and a remote computing device comprising:

a communication element for receiving the ballot data from the kiosk computer device;

a processor configured to run a program for managing the ballot data and user information associated with the ballot data, the processor further configured to validate the ballot data and send validation instructions to the kiosk computing device; and a memory configured to store a database of the ballot and the user information;

the kiosk computing device being configured to receive the validation instructions from the remote computing device and instruct the locking mechanism to unlock the door only if the ballot data is valid.

* * * * *